UNITED STATES PATENT OFFICE.

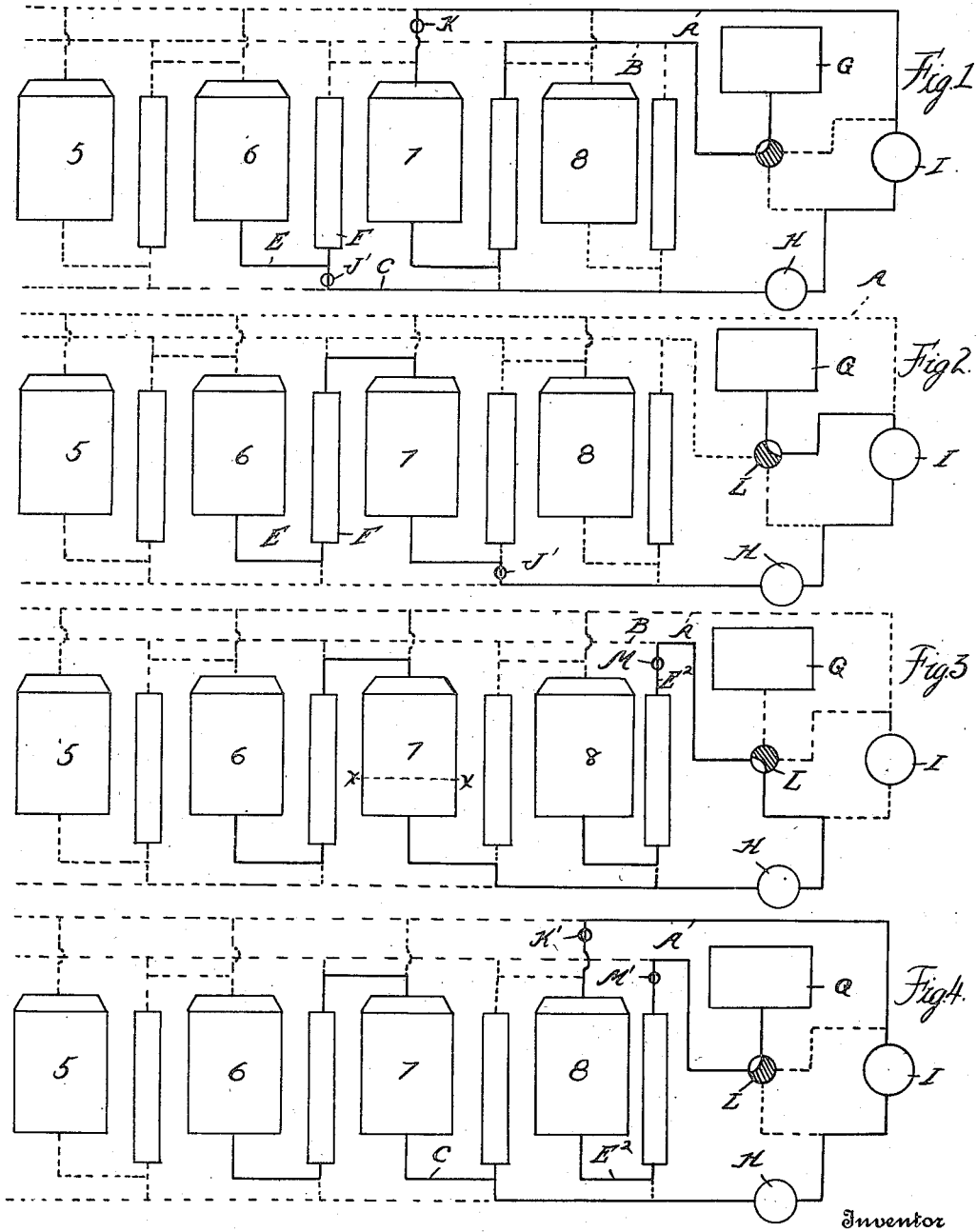

LEON NAUDET, OF CHELLES, FRANCE.

PROCESS OF EXTRACTING SUGAR.

1,281,057.  Specification of Letters Patent.  Patented Oct. 8, 1918.

Application filed May 24, 1917. Serial No. 170,599.

*To all whom it may concern:*

Be it known that I, LEON NAUDET, a citizen of the Republic of France, residing at Chelles, S. and M., in the Republic of France, have invented certain new and useful Improvements in Processes of Extracting Sugar, of which the following is a specification, reference being had therein to the accompanying drawings.

The invention relates to sugar-extraction processes of that type in which the sugar-producing material is successively placed in cells of a diffusion battery, water being introduced into the cell containing the nearly exhausted material and increasing in sugar-content as it passes through the series to the last-filled cell. It is the object of the present invention to obtain a higher extraction and juice of a greater density, and I have discovered that both of these results are facilitated by pre-heating the material to a high temperature before initiating the extraction process. I have further discovered a novel method of effecting this pre-heating without sugar extraction, as hereinafter set forth.

The extraction of sugar from beets or other sugar-producing material is based on the physical principle of osmosis, by which the juice within the cell of the beet will be transferred to a surrounding liquid weaker in sugar-content. If, however, the sugar density of the juice outside of the cell is equal to that inside there will be no extraction. I therefore am enabled to pre-heat the sugar-producing material without extraction by subjecting it to contact with hot juice which is equal or approximately equal in sugar density to the juice within the material.

To raise the temperature of any given quantity of sugar-producing material to that of the juice used for heating, it is necessary to pass over the material three times its weight of hot juice. If, therefore, the material is to be pre-heated without extraction the dense hot juice passed over each portion thereof must be equal to three times its weight. Ordinarily the juice derived from any cell or tank of the battery is not uniform in density, for the reason that the portion first passing over the material will absorb the larger part of the sugar-content, and the portions successively passing over the partly-exhausted material will receive less and less of the sugar; consequently the juice passing from each tank or cell varies in density between maximum and minimum limits. I therefore make use of only the denser portion of the juice for a pre-heating agent, thereby avoiding extraction before the material has acquired the proper temperature.

My improved process may be carried out in a diffusion battery of ordinary construction, and in the drawing:

Figures 1 to 4 inclusive illustrate diagrammatically a series of cells of an extraction battery and the successive operations, the path of the juice during each operation being indicated in full lines and the remainder of the conduit system indicated in dotted lines.

5, 6, 7 and 8 are the tanks or cells of a diffusion battery, which may be assumed to be of any number desired. These cells are preferably interconnected by a series of pipes or conduits A, B, C extending longitudinally of the series, together with conduits E between adjacent cells containing small heaters F. There is also a measuring tank G, a pump H and a large heater I sufficient in capacity to raise the temperature of any juice passing therethrough to the maximum point desired. The arrangement is such that in operation the tanks or cells may be successively emptied and filled, and coupled in to the system which is advanced step-by-step in endless rotation.

As has been stated, it is essential to the process, first, that the beets or other sugar-producing material in the tanks should be raised in temperature by contact with hot juice; and second, that the juice used for raising the temperature should be of high density, approximating that of the juice within the cells of the beets, whereby extraction is prevented. The required temperature may be imparted to the juice by passing it through the heater I, but as the density of each draw varies between maximum and minimum limits, it is essential that only the denser portions should be used as a heating agent. For instance, it may be assumed that the density of a draw of juice passing from one of the cells varies between 17% and 14% of sugar-content, the 17% juice being in advance and the 14% at the rear. The 17% juice is of such a density as to have little extracting effect when in contact with fresh beets or sugar-producing material, but it cannot be passed directly from the cell in which it is derived to the newly filled cell in advance thereof, for the reason that the juice must first be heated and must be passed through the conduit E to the pump H and heater I and then back through the conduit A to the new cell. Obviously these conduits and connected devices have a capacity for a considerable volume of juice, and as they must remain full at all times certain portions will contain dense juice and other portions the less dense juice. It is therefore possible that in the operation of the system the hot juice returned for use in heating the fresh beets may be lacking in density, so that extraction will occur before raising the material to the required high temperature. Such an effect I have avoided by my present method, by drawing out of the system and directly into the measuring tank the less dense portions of the juice, thereby leaving in the system only the denser juice to be re-heated and used for imparting its heat to the material in the new cells.

The specific method of manipulation will vary according to the construction, size and proportion of the various elements in the battery, but as shown in the drawings is as follows: In Fig. 1 it is assumed that the cells or tanks 5 and 6 are connected into the system and that the cell 7 has been newly charged with beets or other sugar-producing material and mashed, the mashing juice being still in the cell. The valves are then adjusted so that the juice will pass from the bottom of the cell 6 through the conduit E, past the open valve J into the conduit C, thence to the pump H, heater I and return conduit A through the open valve K and into the top of cell 7. Assuming also that the juice within the conduits C and A and in the heater I is high in density and that the juice leaving the cell 6 has by extraction from the beets therein become equally high in density, it will be understood that such juice will be heated in transit and will enter the cell 7 at the required high temperature. The juice in advance will lose its heat by transference to the beets or other material which are at much lower temperature, so that before it is passed through the cell there will be a considerable temperature drop. However, this is not detrimental, as the juice is of such density that no extraction will take place and the only effect produced is a heating of the beets. As the flow continues, the juice leaving the cell 6 will drop in density, due to the partial exhaustion of the beets therein, with the result that the conduit C and heater I will be filled with juice of lower density, approaching the minimum limit. This low-density juice, if permitted to remain in the system would be eventually transferred to the top of a newly-charged cell, which would be objectionable by causing extraction before the material was raised to the proper temperature,—but I avoid such a result by the step illustrated in Fig. 2. In this figure the valves have been changed, so that the juice from the bottom of the tank 6 passes through the conduit E and small heater F directly into the top of the cell 7, while the dense juice displaced from said cell 7 passes through the open valve J' into the conduit C in rear of the less dense juice in said conduit and in the heater I. A valve L is then adjusted to permit the juice in the heater I to pass directly into the measuring tank G, and the flow is continued until all of the less dense juice has been displaced into said tank and the dense juice from the cell 7 has re-filled the conduit C and heater I. Thus the system has been cleared of the weak juice and the dense juice which displaced it has come into proximity to the dense juice remaining in the conduit A. It is of course true that the juice from the cell 6 which passes directly to the top of the cell 7 is lacking in density, but it is high in temperature, and as the beets in the upper portion of the cell 7 are also at the required high temperture sugar extraction may take place without detriment. This in turn will strengthen up the weaker juice to the maximum strength required so that when it reaches a point in the cell 7 where the temperature of the beets is lower than required it will cease further extraction and operate solely as a heating agent.

A succeeding step in the process is illustrated in Fig. 3, where the valve L is again changed so as to connect the conduit C and pump H with the conduit B, the juice passing therethrough and through the open valve M into the conduit E² and bottom of cell 8, which latter has just been recharged with fresh beets and is mashed by the entering juice. At the same time a second pass of hot juice from the cell 6 has entered the top of the cell 7, carrying the heating of the beets to the maximum temperature to a still lower point or approximately two-thirds of the way down therein as indicated by line x—x. Extraction also takes place in the cell 7 whenever the less dense hot juice comes in contact with unextracted hot beets, but before the weak juice can reach a point where the beets are below the required temperature it will be strengthened up to the maximum required. Thus the heating of the beets by dense hot juice is always in advance of the extraction of sugar from said beets by less dense juice.

In Fig. 4 the final step of the cycle is illustrated, in which the valves are so adjusted that the juice passes from the bottom of the cell 6 to the top of cell 7, from the bottom of cell 7 to the conduit C, thence to the pump H, heater I, conduit A and open valve K' to the top of the cell 8, where it displaces the mashing juice in said cell, causing it to pass from the bottom of the cell through the conduit $E^2$, open valve M to conduit B and valve L into the measuring tank. It will be remembered that the heater I has been previously filled with dense juice during the step illustrated in Fig. 2, so that the hot juice entering the top of the cell 8 is both high in heat and high in density.

The total effect of the several steps of the process as just described is to pass three volumes of hot juice through each newly-charged cell, which is required to bring all portions of the contents of the cell up to the required temperature. Also the density of the juice when in contact with beets that are less than the required temperature is always at the maximum point desired, so that no extraction of sugar takes place until the beets are at the required temperature. This, as has been stated, establishes the most favorable condition for extraction and results in the obtaining of juice of higher density and more complete extraction of the sugar content from the sugar-producing material.

What I claim as my invention is:—

1. The method of operating sugar-extraction battery systems, comprising the removal from the system of less dense portions of juice intermediate more dense portions thereof.

2. The method of operating sugar-extraction battery systems, comprising the passage of dense extraction juice through a reheater to raise the temperature thereof before introduction into a newly-charged cell, and removing the less dense juice from the system in rear of said heater to re-heat only the denser juice.

3. The method of operating sugar-extraction battery systems, comprising the reheating of dense extraction juice and the passage of the same over sugar-producing material to raise the temperature without extraction, and the passage of the less dense juice out of the system.

4. The process of extracting sugar, comprising the passage of juice through a series of cells successively re-charged, the reheating of the denser portions of the extraction juice and the passage of the same through the newly-filled cell to raise the temperature of the material therein before extraction, and the by-passing of the less dense juice to withdraw the same from the system.

5. The method of operating sugar-extracting battery systems comprising the removal from the system of less dense portions of juice, which displace and follow more dense portions thereof, in advance of the removal from the system of said more dense portions.

6. The process of extracting sugar, comprising the passage of juice through a series of cells successively recharged, the reheating of the denser portions of the extraction juice and the passage of the same through the newly filled cell to raise the temperature of the material therein before extraction, and the by-passing of the less dense and portions of the mixed dense and less dense juice to withdraw the same from the system.

In testimony whereof I affix my signature.

LEON NAUDET.